United States Patent [19]

Hollaway et al.

[11] Patent Number: 5,713,305

[45] Date of Patent: Feb. 3, 1998

[54] CAGE-MOUNTED FEEDER

[76] Inventors: Oveta D. Hollaway; Robert J. Hollaway, both of P. O. Box 1526, Lexington, S.C. 29071

[21] Appl. No.: 549,039

[22] Filed: Oct. 27, 1995

[51] Int. Cl.$^6$ .......................... A01K 31/12; A01K 39/014
[52] U.S. Cl. ................................. 119/464; 119/468
[58] Field of Search ................................. 119/464, 466, 119/468; D30/124

[56] References Cited

PUBLICATIONS

1996 Catalog by Vo-Toys, Inc. pp. 33-35.
1996 Catalog by Choo-Choo Imports, p. 10.
Advertisement by Birds-Maid Products, Jan. 1996 issue of Bird Talk Magazine, p. 75.

*Primary Examiner*—Robert P. Swiatek
*Assistant Examiner*—Elizabeth Shaw

[57] ABSTRACT

A feeder for mounting on an interior wall of a cage is disclosed. The feeder includes a clamping mechanism for clamping onto a wall of a cage, and an extension bar extending from the clamping mechanism to the interior of the cage, and a receptacle which holds a feeder cup affixed at the interior end of the extension bar. By positioning the feeder cup away from a wall of the cage, the extension bar of the invention provides numerous advantages. Positioning the feeder cup away from a cage wall prevents the scattering of feed outside of a cage, improves the ability of a watcher to watch feeding, and improves the accessibility of the feeder cup for easy removal and replacement of the feeder cup.

13 Claims, 1 Drawing Sheet

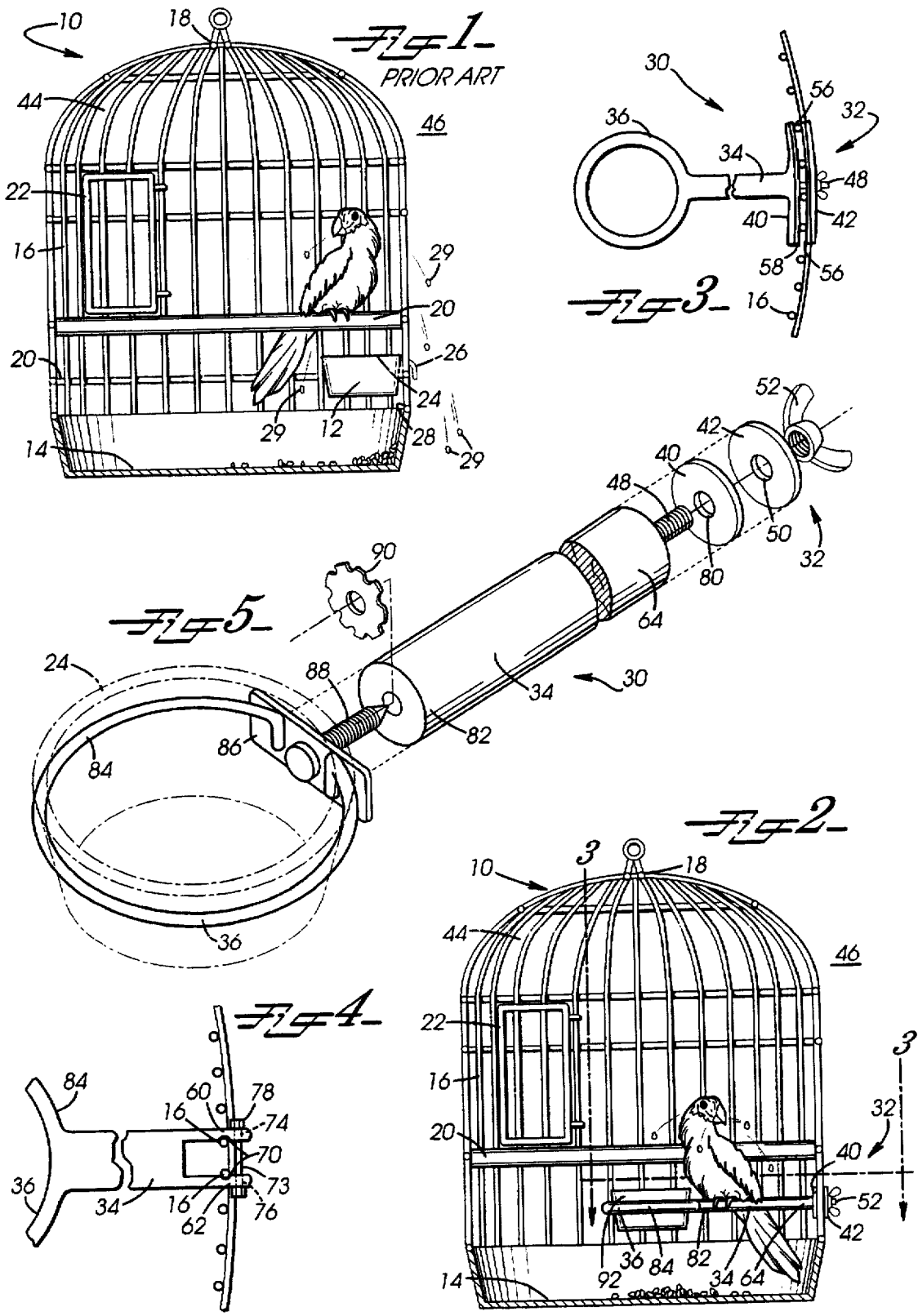

CAGE-MOUNTED FEEDER

BACKGROUND OF THE INVENTION

1. Field of the Invention

The present invention relates to animal feeders in general and more particularly to a cage-mounted feeders for use in feeding animals in or outside a cage.

2. Discussion of Background

Typically, a feeder of a cage is mounted directly onto a wall of the cage with use of hooks, pegs, or with spring-loaded clasping mechanisms.

The major disadvantage of currently available cage feeders is the positioning of such feeders within a cage against a cage wall. When animals feed from a feeder they commonly "scatter" feed from the feeder and into the area underneath the feeder. Because the typical feeder is positioned against a cage wall, much of this falling seed falls outside of the cage.

Feeders must constantly be removed from a cage and replenished with a supply of feed. Prior art feeders are difficult to remove first of all, because of the cumbersome latching mechanisms normally used to attach them to a cage wall. The removal problem is made even more difficult because feeders are mounted such that they are not easily accessed from and retrieved through a cage door.

There exists a need for a feeder that is positioned so as not to encourage the spilling of feed out of a cage, which enables optimum viewing and which is easily removed from a cage.

SUMMARY OF THE INVENTION

According to its major aspects and broadly stated, the present invention is a feeder having a feeder cup positioned away from the cage wall.

The feeder of the present invention includes a clamp for clamping the feeder to a cage wall. Extending from clamp is an extension bar which extends into the interior of a cage and terminates in a receptacle for receiving a feeder cup. A feeder cup is disposed in the receptacle.

The clamping mechanism used to clamp the feeder to a cage preferably comprises an interior brace which abuts cage bars toward the interior of the cage, and an exterior brace opposing the front member abutting bars of the cage toward the exterior of the cage. A threaded bolt member extends from a front member through holes in the rear member. The clamping mechanism is secured to a cage preferably by a wing nut threaded onto the threaded bolt member.

The extension bar has a first end attached to or integral with the clamping mechanism and a second end extending into the cage. A receptacle is attached to or integral with the second end of the extension bar. Preferably, the receptacle is generally ring-shaped and is adapted to receive a feeder cup.

A feeder cup is disposed in the receptacle. The feeder cup will be flared or have a ridge or flange formed at its top so that the bottom end of the feeder cup can fit into the ring-shaped receptacle but the top end will rest on the receptacle. The feeder cup is removed from the receptacle by simply lifting the feeder cup up and out of the receptacle. Some receptacles have a metal tab which may be attached so that the cup cannot be removed by the animal.

The extension bar is of sufficient length such that substantially all feed scattered from a feeder cup positioned at the second end of the extension bar will fall into the cage and not outside of the cage. The extension bar of the feeder, in addition to positioning a feeder cup away from a cage wall, serves as an additional perch or extender inside the cage.

Feeding from a feeder cup positioned away from a cage wall will not scatter nearly as much feed from the cup outside of the cage. Further, feeding from a feeder cup positioned as described will be in a position within the cage where they are easily observed. Still further, a feeder cup positioned generally at the center of a cage is easily retrieved from a cage.

A major feature of the invention is the extension bar which extends from a clamping mechanism at a cage wall to a point away from the wall where it terminates in a feeder cup receptacle. The extension bar positions a feeder cup at a point within a cage where feed in the cup will not be scattered out of the cage in significant amounts by feeding, where feeding out of the cup can be easily viewed, and where the feeder cup is easily retrieved through a door of the cage. The extension bar, in addition, serves as an additional perch inside the cage.

Another important feature of the invention is the receptacle of the feeder cup which is configured to hold a feeder cup such that a feeder cup can be retrieved simply by lifting the feeder cup out of the receptacle. The cup-receiving receptacle works in combination with the extension bar (which positions the cup to a location where it is easily accessed) to provide a feeder wherein a feeder cup is easily retrieved for repeated filling and refilling of the cup.

Still another important feature of the invention is the clamping mechanism which clamps the feeder to a cage wall. The clamping mechanism is easily attached and detached from a cage wall, yet holds a feeder with sufficient force to support a receptacle extending perpendicularly from a cage wall as many as several inches away from the clamping mechanism.

Yet another feature is the extension bar which serves two functions: it is both a perch and a means for significantly reducing the amount of seeds scattered to the area outside the cage.

Other features and advantages will become apparent to those skilled in the art from a careful reading of the Detailed Description of Preferred Embodiment accompanied by the following drawings.

BRIEF DESCRIPTION OF THE DRAWINGS

In the drawings,

FIG. 1 is a perspective view of a cage having a prior art feeder installed therein;

FIG. 2 is a perspective view of cage having a feeder in accordance with the invention installed therein;

FIG. 3 is a top view of a feeder according to the invention taken along line 3—3 of FIG. 2.

FIG. 4 is a top view of an alternative clamping mechanism according to the invention.

FIG. 5 shows a perspective view of an alternative embodiment of a feeder according to the invention.

DETAILED DESCRIPTION OF PREFERRED EMBODIMENTS

FIG. 1 shows a typical cage 10 having installed therein a prior art feeder 12. Cage 10 includes a bottom 14 and a plurality of bars 16 extending upwardly about the periphery thereof and meeting at top 18. A perch 20 extends laterally across cage 10. Cage 10 further includes a door 22 through which animals and equipment are inserted into and retrieved from cage 10. Prior art feeder 12 includes a feeder cup 24 and may have hooks 26 for attaching to a transverse bar 20 of cage 10. When installed, feeder cup 24 of prior art feeder 12 abuts wall 28 of cage 10. In this position, feed 29 carried by feeder cup 24 will be scattered outside of cage when feeding from feeder cup 24.

A cage 10 having a feeder according to the invention is shown in FIG. 2. Feeder 30 includes a clamping mechanism 32 for clamping feeder 30 to cage 10, an extension bar 34 extending into cage 10 and terminating in a receptacle 36, and a feeder cup 24 installed in the receptacle. Cage 10 is of the type that typically houses an animal that is kept in the cage for more than a brief or temporary period. In other words, cage 10 serves as a home more than a temporary transportation cage or temporary housing.

Referring to FIGS. 2 and 3, clamping mechanism 32 may comprise a pair of braces 40 and 42 that are clamped together against bars 16 of cage 10 to secure feeder 30 to cage 10. Interior brace 40 is positioned in the interior 44 of cage 10, and exterior brace 42 is positioned opposite interior brace 40 at the cage's exterior 46. A threaded bolt 48 extends from or through interior brace 40, through cage 10, and through a hole 50 in exterior brace 42. Interior and exterior braces 40 and 42 may be clamped together against cage 10 by a nut, which may be wing nut 52 threaded onto threaded bolt 48. When wing nut 52 is tightened, interior and exterior braces 40 and 42 squeeze together against bars 16 to secure feeder 30 to cage 10. Each brace 40 and 42 should be formed to contact and apply pressure against at least two bars 16 of cage 10. However, for additional securing force, braces 40 and 42 may be curved at the same curvature of cage 10 to contact more than two bars 16, as best seen in FIG. 3. Of course, if cage 10 is a square-based cage, then braces 40 and 42 may easily be made to contact more than two bars by expanding the width of each bar. Friction-producing material, such as rubber members 56, may be affixed at the opposing surfaces of each brace 40 and 42 to improve the gripping force of the braces. Braces 40 and 42 may be provided by steel washers, as seen in FIG. 5.

A clamping mechanism according to the invention may also comprise a pair of opposing leaf members as shown in FIG. 4. In the embodiment of FIG. 4, first and second leaf members 60 and 62 extend coextensively from first end 64 of extension bar 34. Leaf members 60 and 62 may be formed to be integral with extension bar 34 or may be formed on a bracket member which is attached to extension bar 34. Led members 60 and 62 are oriented to brace sides of a pair of cage bars 16 as shown. Each leaf member 60 and 62 preferably includes a groove 70 for engaging a cage bar 16, and may include a friction-producing material member, such as a rubber member disposed in each groove 70. A bolt 73 is inserted through aligned holes 74 and 76 of a pair of opposing leaf members. When nut 78 is tightened about bolt 73, leaf members 60 and 62 exert a clamping force about cage bars 16 to secure the feeder 30 to the cage 10.

In the embodiments of FIGS. 2, 3, and 5, extension bar 34 of feeder 30 extends from interior brace 40 and into the interior of cage 10 where it terminates in receptacle 36. Extension bar 34 may be formed to be integral with interior brace 40 or fixedly attached thereto, but preferably extension bar 34 is abutted against interior brace 40 by the clamping force of wing nut 52 against exterior brace 42. In a preferred embodiment of feeder 30, threaded bolt 48 extending through cage 10 and through hole 50 of exterior brace 42, rigidly extends coaxially from first end 64 of extension bar 34 and through a hole 80 of interior brace 40. Extension bar 34 may be formed, for example, from wood, cement, plastic, lightweight metal, ceramic material, polyvinyl chloride (PVC), or any other suitable rigid material.

Receptacle 36 at second end 82 of extension bar 34 is preferably a ring 84 as best seen in FIG. 3. Ring 84 may be formed to be integral with extension bar 34 as shown in FIG. 3, or may be attached to extension bar 34 as shown in FIG. 5. In the embodiment of FIG. 5, ring 84 is welded to bracket 86 which is attached to wood extension bar 34 by way of screw 88. For preventing twisting of ring 84, lock washer 90 may be fitted on screw 88 before bracket 86 is attached to extension bar 34.

Ring 84 is formed to receive feeder cup 24. Feeder cup 24 and ring 84 are configured complementary such that feeder cup 24 can be installed in ring 84 simply by inserting feeder cup 24 into ring receptacle 84, and removed simply by lifting feeder cup 24 out of ring receptacle 84. Feeder cup 24 may be formed to have a ridge 92 about its periphery that engages ring 84 when inserted into ring receptacle 84, as seen in FIG. 3. In the alternative, as seen in FIG. 5, feeder cup 24 may be formed to have an increasing diameter from bottom to top, with a diameter smaller than that of ring 84 at its bottom, and a diameter larger than ring 84 at its top.

Extension bar 34 positions feeder cup 24 away from a cage wall 28. Preferably, extension bar 34 is of at least a length equal to the width of the animal in the cage. For most applications a length of at least three inches, to position feeder cup 24 from the wall at which feeder 30 is attached, will be suitable. However, most preferably, extension bar 34 positions feeder cup 24 to a point in cage 10 about 6 to 9 inches from any wall of cage 10. It should be noted that these dimensions are for illustrative purposes only and are not to be considered limiting. Other lengths of extension bar 34 are possible and contemplated, as long as extension bar 34 performs its desired function.

Positioning feeder cup 24 away from wall 28 provides numerous advantages. Foremost, if feeder cup 24 is positioned away from wall 28, feeding from feeder cup 24 will not scatter a substantial amount of feed 29 out of cage 10. Instead, substantially all of the feed 29 scattered from feeder cup 24 will be scattered within the cage 10 and collected by cage bottom 14. Furthermore, observing the animal is at its most interesting and entertaining level when feeding. By positioning feeder cup 24 near the center of cage 10, observation of feeding from any position relative to cage 10 may be done.

Positioning feeder cup 24 away from wall 28 also provides easy access to feeder cup 24 from door 22 of cage 10 and makes feeder cup 24 easier to remove and reinstall. In the present invention, two features make feeder cup 24 easy to remove and reinstall. First, feeder cup 24 is positioned away from wall 28 so that it is easily accessed, and second, feeder cup 24 is mounted on receptacle 36 such that it is removed from ring 84 simply by lifting the feeder cup 24 out of the receptacle 36. These two features work in combination to provide a feeder, including a feeder cup, that is especially easy to remove and reinstall.

In addition to positioning feeder cup 24 away from wall 28, extension bar 34 serves as an additional perch 20 residing inside cage 10. Because extension bar 34 will serve as a perch 20 inside the cage, it will preferably be of a configuration adapted for perching. Most preferably, extension bar 34 is cylindrical and has a diameter dependent on the size expected to perch 20 on extension bar 34.

It will be clear to those skilled in the art to which the present invention pertains from a reading of the foregoing that many changes and substitutions can be made to the preferred embodiments without departing from the spirit and scope of the present invention, which is defined by the appended claims.

What is claimed is:

1. A feeder for a cage, wherein the cage has a plurality of cage bars forming a wall and an interior, wherein the cage is for use in housing an animal, said feeder comprising:
   an extension bar having a first end and a second end and a length, said second end for extending into the interior of the cage and spaced apart from the wall of the cage, said length of said bar being at least three inches;
   attaching means connected to said first end of said extension bar for attaching said extension bar to the wall of the cage, wherein said attaching means comprises first and second leaves coextensive with said extension bar and extending from said first end of said extension bar and means for urging said second leaf against said first leaf; and
   a receptacle affixed at said second end of said extension bar.

2. The feeder of claim 1, wherein said receptacle comprises a ring, and wherein said feeder further comprises:
   a feeder cup received in said receptacle, said feeder cup having a ridge for engaging said ring, whereby said feeder cup is retrievable from said ring by lifting said feeder cup from said ring.

3. The feeder of claim 1, wherein said receptacle comprises a ring having a diameter, and wherein said feeder further comprises:
   a feeder cup received in said ring, said feeder cup having a top and a bottom, said top having a larger diameter than said bottom, said diameter of said top being greater than said diameter of said ring, whereby said feeder cup can rest on said ring.

4. The feeder of claim 1, wherein said extension bar is a cylinder made of a material selected from the group consisting of metal, ceramic, wood, plastic, cement, polyvinyl chloride (PVC), and any other rigid material.

5. The feeder of claim 1, said feeder further comprising:
   a feeder cup received in said receptacle.

6. A feeder for a cage, wherein the cage has a plurality of bars forming a wall and an interior, wherein the cage is for use in housing an animal, said feeder comprising:
   a clamping mechanism able to be clamped to at least one of the bars of the cage wherein said clamping mechanism includes first and second leaves coextensive with said extension bar and extending from said first end of said extension bar and means for urging said second leaf against said first leaf;
   an elongated extension bar extending from said clamping mechanism, said extension bar having a first end and a second end and a length, said second end extending into the interior of the cage, said length of said bar being at least three inches;
   a feeder cup; and
   means for holding said feeder cup affixed at said second end of said bar, said feeder cup holding means receiving said feeder cup, said feeder cup being spaced apart from the wall of the cage.

7. The feeder of claim 6, wherein said feeder cup holding means comprises a ring, and wherein said feeder cup has means for engaging said ring, whereby said feeder cup is retrievable from said ring by lifting said feeder cup from said ring.

8. The feeder of claim 6, wherein said receptacle comprises a ring having a diameter, and wherein said feeder cup includes a top and a bottom, said top having a larger diameter than said bottom, said diameter of said top being larger than said diameter of said ring, whereby said feeder cup can rest on said ring.

9. The feeder of claim 6, wherein said extension bar is a cylinder made of a material selected from the group consisting of metal, ceramic, wood, plastic, cement, polyvinyl chloride (PVC), and any other rigid material.

10. A device for housing an animal, said device comprising:
    a cage, said cage having an interior and a plurality of bars forming a wall; and
    a feeder comprising
      a clamping mechanism clamped to at least one of said bars of said cage wherein said clamping mechanism includes first and second leaves coextensive with said extension bar and extending from said first end of said extension bar and means for urging said second leaf against said first leaf;
      an elongated extension bar extending from said clamping mechanism, said extension bar having a first end and a second end and a length, said second end extending into said interior of said cage, said length of said bar being at least three inches,
      a feeder cup; and
      means for holding said feeder cup affixed at said second end of said bar, said feeder cup holding means receiving said feeder cup, said feeder cup being spaced apart from said wall.

11. The device of claim 10, wherein said feeder cup holding means comprises a ring, and wherein said feeder cup has means for engaging said ring, whereby said feeder cup is retrievable from said ring by lifting said feeder cup from said ring.

12. The device of claim 10, wherein said receptacle comprises a ring having a diameter, and wherein said feeder cup includes a top and a bottom, said top having a larger diameter than said bottom, said diameter of said top being larger than said diameter of said ring, whereby said feeder cup can rest on said ring.

13. The device of claim 10, wherein said clamping mechanism comprises:
    an interior brace connected to said first end of said extension bar;
    an exterior brace opposing said interior brace; and
    means for urging said exterior brace against said interior brace.

* * * * *